United States Patent
Engin et al.

(10) Patent No.: US 7,895,540 B2
(45) Date of Patent: Feb. 22, 2011

(54) MULTILAYER FINITE DIFFERENCE METHODS FOR ELECTRICAL MODELING OF PACKAGES AND PRINTED CIRCUIT BOARDS

(75) Inventors: Ege Engin, Atlanta, GA (US);
Madhavan Swaminathan, Marietta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 155 days.

(21) Appl. No.: 11/888,705

(22) Filed: Aug. 2, 2007

(65) Prior Publication Data

US 2010/0218145 A1    Aug. 26, 2010

Related U.S. Application Data

(60) Provisional application No. 60/835,381, filed on Aug. 2, 2006, provisional application No. 60/835,243, filed on Aug. 2, 2006.

(51) Int. Cl.
*G06F 17/50* (2006.01)
*H03K 17/693* (2006.01)

(52) U.S. Cl. .................... 716/4; 716/106; 716/107; 716/132; 716/136; 716/137; 716/139; 703/14

(58) Field of Classification Search ............... 716/1, 716/2, 4, 5, 7, 15, 16, 20
See application file for complete search history.

(56) References Cited

U.S. PATENT DOCUMENTS 6,188,582 B1 *  2/2001  Peter .......................... 361/760
7,088,782 B2 *  8/2006  Mody et al. .................. 375/260
RE41,001  E  * 11/2009  Oshima et al. ............... 375/219
2008/0091389 A1 *  4/2008  Kim et al. ....................... 703/2
2010/0217576 A1 *  8/2010  Bharath et al. ................ 703/14

OTHER PUBLICATIONS

Lee et al.; "Analysis of power delivery network constructed by irregular-shaped power/ground plane including densely populated via-hole"; Publication Year: 2005; Advanced Packaging, IEEE Transactions on; vol. 28, Issue: 2; pp. 168-173.*

Wu et al.; "Composite effects of reflections and ground bounce for signal line through a split power plane"; Publication Year: 2002; Advanced Packaging, IEEE Transactions on; vol. 25, Issue: 2; pp. 297-301.*

Bharath et al.; "Efficient Simulation of Power/Ground Planes for SiP Applications"; Publication Year: 2007; Electronic Components and Technology Conference, 2007. ECTC '07. Proceedings. 57th; pp. 1199-1205.*

(Continued)

*Primary Examiner*—Helen Rossoshek
(74) *Attorney, Agent, or Firm*—Bryan W. Bockhop; Bockhop & Associates, LLC

(57) ABSTRACT

Disclosed are exemplary finite difference methods for electromagnetically simulating planar multilayer structures. The exemplary finite difference methods simulate multilayer planes by combining the admittance matrices of single plane pairs and equivalent circuit models for such single plane pairs based on multilayer finite difference approximation. Based on the methods, coupling between different layers through electrically large apertures can be modeled very accurately and efficiently.

18 Claims, 12 Drawing Sheets

OTHER PUBLICATIONS

Engin et al.; "Finite-difference modeling of noise coupling between power/ground planes in multilayered packages and boards"; Publication Year: 2006; Electronic Components and Technology Conference, 2006. Proceedings. 56th.*

Pan et al.; "A combined finite difference and analytic expression approach to crossover capacitance in a multilayer dielectric environment"; Publication Year: 1996; Components, Packaging, and Manufacturing Technology, Part B: Advanced Packaging, IEEE Transactions on; Bharath et al.;vol. 19 , Issue: 3; , pp. 615-620.*

Bharath et al.; "Computationally Efficient Power Integrity Simulation for System-on-Package Applications"; Publication Year: 2007; Design Automation Conference, 2007. DAC '07. 44th ACM/IEEE; , pp. 612-617.*

Bushyager et al.; "Q-factor prediction and optimization of multilayer inductors for RF packaging microsystems using time domain techniques"; Publication Year: 2002; Electronic Components and Technology Conference, 2002. Proceedings. 52nd; , pp. 1718-1721.*

Horii et al.; "Super-compact multilayered left-handed transmission line and diplexer application"; Publication Year: 2005; Microwave Theory and Techniques, IEEE Transactions on; vol. 53, Issue: 4, Part: 2; pp. 1527-1534.*

Pan et al; "A combined finite difference and analytic expression approach to crossover capacitance in a multilayer dielectric;environment"; Publication Year: 1996; Components, Packaging, and Manufacturing Technology, Part B: Advanced Packaging, IEEE Transactions on; vol. 19 , Issue: 3; pp. 615-620.*

Kim, Joong-Ho, "Modeling of Multilayered Power Distribution Planes Using Trasmission Matrix Method" IEEE Transactions on Advanced Packaging, vol. 25, No. 2, May 2002.

Application hereby notifies the Examiner of the following two pending US patent applications that each name a common inventor with the present application and that are both owned by the Assignee of the present US Appl. No. 12/288,616, filed Oct. 22, 2008; and U.S. Appl. No. 12/710,991, filed Feb. 23, 2010.

* cited by examiner

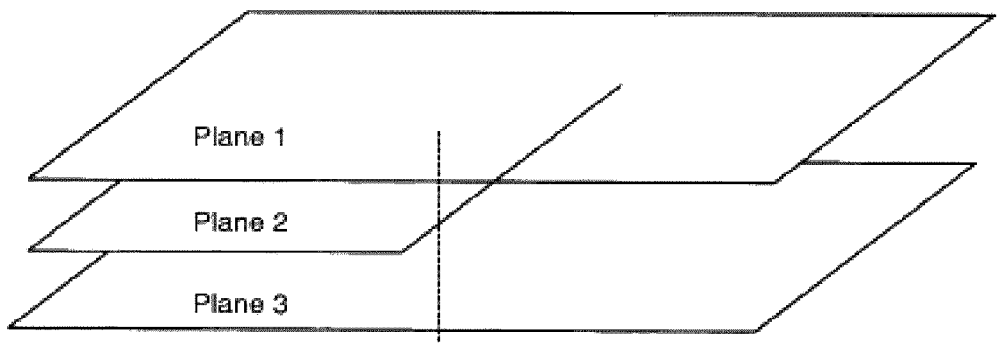
Fig. 6
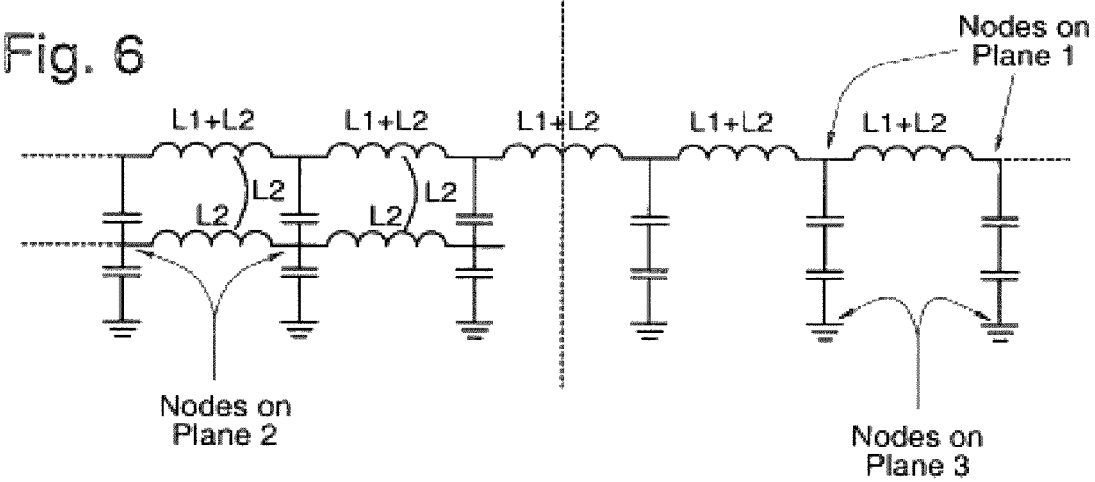
Fig. 13
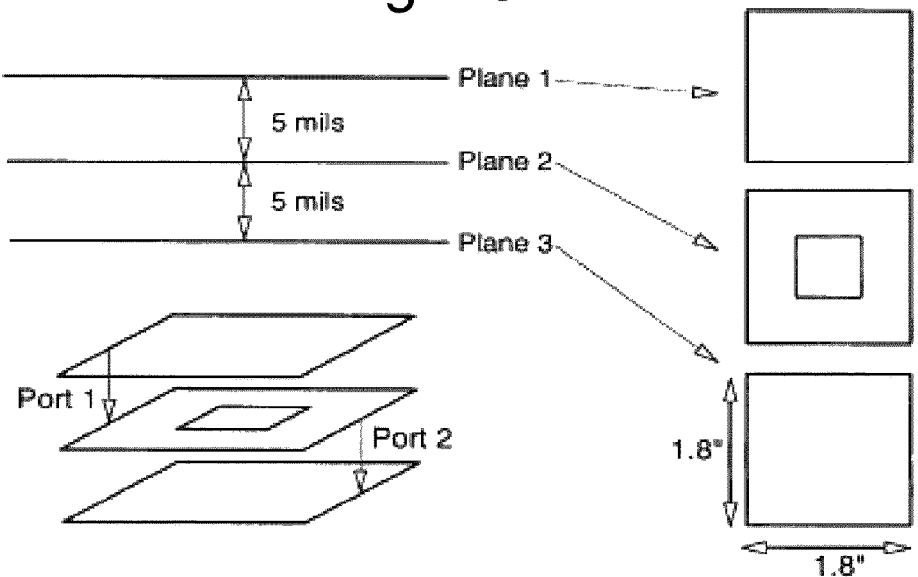

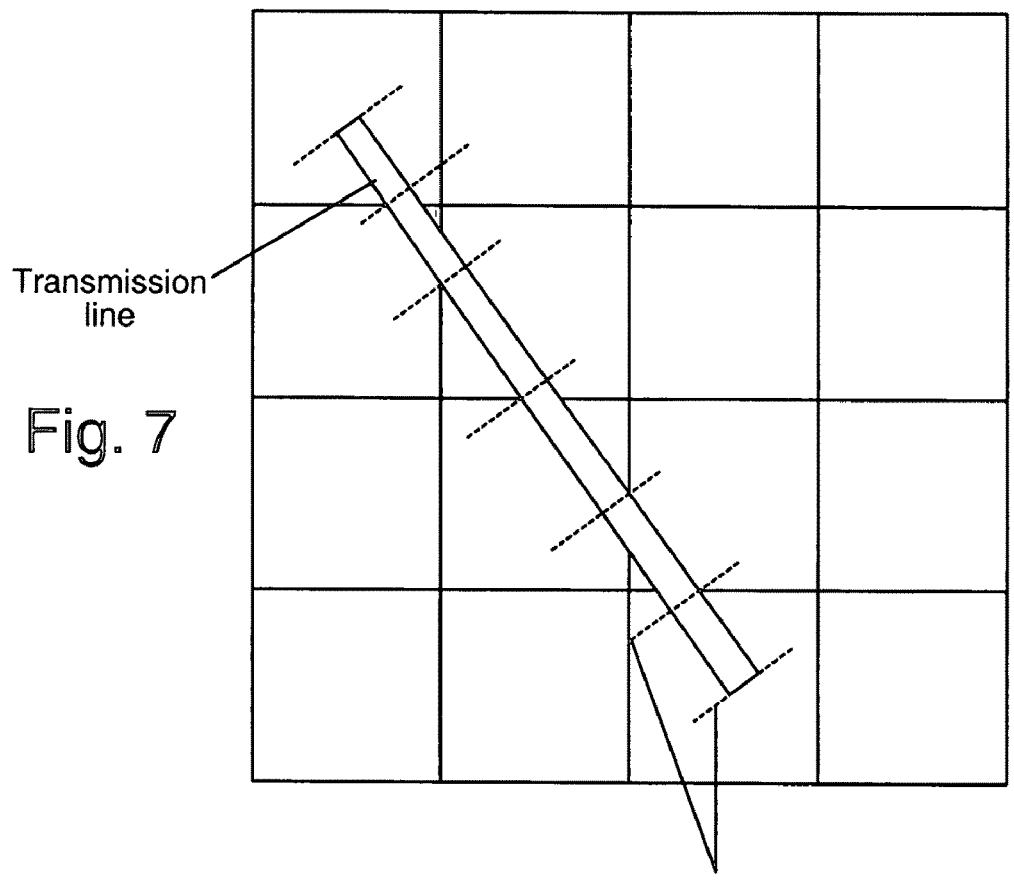
Fig. 7
Dashed lines showing the boundaries of each transmission line segment
Fig. 8
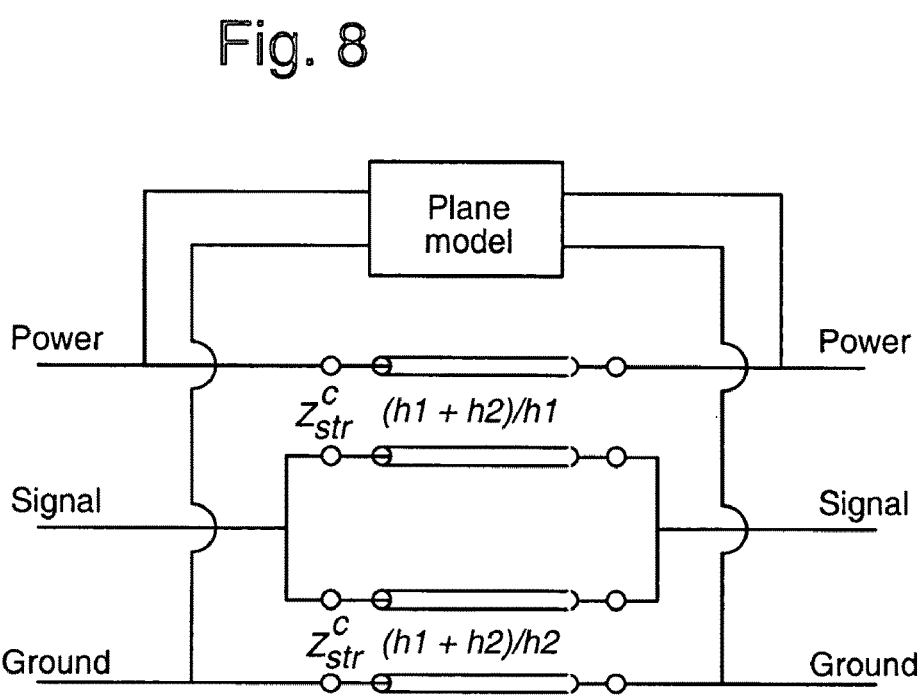

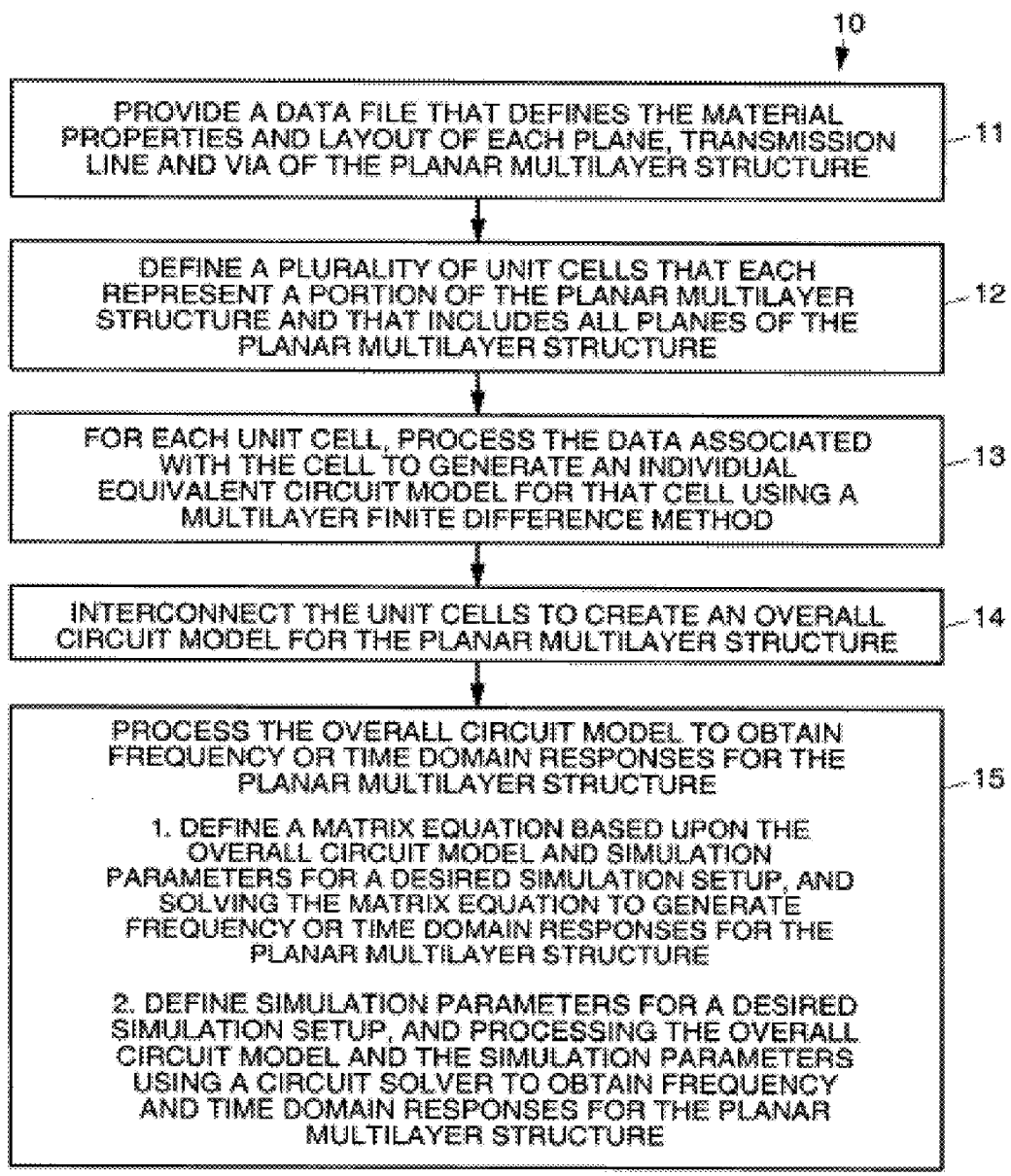

MULTILAYER FINITE DIFFERENCE METHODS FOR ELECTRICAL MODELING OF PACKAGES AND PRINTED CIRCUIT BOARDS

This application claims the benefit of U.S. Provisional Application Ser. No. 60/835,381 filed on Aug. 2, 2006 and U.S. Provisional Application Ser. No. 60/835,243 filed on Aug. 2, 2006, the entirety of each of which is hereby incorporated by reference.

BACKGROUND

The present invention relates generally to electromagnetic simulation methods and software, and more particularly, to finite difference methods and software that are used for electromagnetic simulation of planar multilayer structures.

A high-performance digital or mixed-signal system can contain thousands of signal lines, which must be routed on several layers in the package and printed circuit board (PCB). These signal layers must be placed between or over power/ground planes in order to have an impedance-controlled board comprising microstrip or stripline transmission lines. A power/ground plane also prevents any coupling of signal lines in an upper layer to signal lines in a lower layer. As a result of this, many power/ground layers have to be included in the stack-up, as shown in FIG. 1. In order to reduce the parasitics of the power delivery network (e.g., to reduce the inductance of the planes), these layers can be allocated to power and ground in an alternating manner such that multiple plane pairs can'exist in a package or board.

Power/ground planes in electronic packaging can be a major factor for noise coupling. There can be noise coupling not only in the transversal direction between two planes, but also in the vertical direction from one plane pair to another through the apertures and via holes. Excessive supply voltage fluctuations cause signal integrity (SI) problems. In addition, noise voltage that gets coupled to the edge of the board may cause significant electromagnetic interference (EMI). Hence, an accurate modeling of power/ground planes is critical to estimate the noise levels especially in mixed-signal systems where high isolation levels are required.

A solid plane made of a perfect conductor of infinite lateral dimensions would completely shield the fields on one side from the other side. Therefore, there would be no need to consider multiple plane pairs. In reality, however, planes at the same dc level have to be connected with vias to each other in order to reduce the effective inductance of the planes. Such a via has to go through a via hole in a plane having a different dc level in order to avoid a short circuit. Through this via and via hole, fields in different plane pairs get coupled to each other. Coupling of multiple plane pairs through such vias has been analyzed using the cavity resonator model by S. Chun, et al., "Modeling of simultaneous switching noise in high speed systems," *IEEE Trans. Adv. Packag.*, vol. 24, no. 2, pp. 132-142, May 2001, the transmission matrix method by J.-H. Kim and M. Swaminathan, in "Modeling of multilayered power distribution planes using transmission matrix method," *IEEE Trans. Adv. Packag.*, vol. 25, no. 2, pp. 189-199, May 2002, and coupled transmission lines by H. Wu, et al., "Accurate power supply and ground plane pair models [for MCMs]," *IEEE Trans. Adv. Packag.*, vol. 22, no. 3, pp. 259-266, August 1999.

In addition, planes generally have irregular geometries. There can be large apertures and splits in planes. Fields in different plane pairs can get coupled through these apertures. This can be regarded as a coupling by means of a wrap-around current on the edges of the planes. For narrow slots, a transmission-line-based model has been proposed to take into account this interlayer coupling. See for example, R. Ito et al., "Parallel plate slot coupler modeling using two dimensional frequency domain transmission line matrix method," in Proc. IEEE EPEP, pp. 41-44, 2004. Electric and magnetic polarization currents have also been considered to compute the coupling through electrically small cutouts. See for example, J. Lee, et al., "Analysis and suppression of SSN noise coupling between power/ground plane cavities through cutouts in multilayer packages and PCBs," *IEEE Trans. Adv. Packag.*, vol. 28, no. 2, pp 298-309, May 2005.

The field penetration through the conductors can be neglected for frequencies, where the skin depth is much smaller than the plane thickness. At lower frequencies, this field penetration has to be taken into account. See for example, J. Mao, et al., "Modeling of field penetration through planes in multilayered packages," *IEEE Trans. Adv. Packag.*, vol. 24, no. 3, pp. 326-333, August 2001. For purposes of the description presented below, the thickness of the metal is assumed to be much larger than the skin depth. This assumption is valid above several megahertz for commonly used copper planes in packages.

For modeling of multilayered planes, recently, a method based on the Green's function and segmentation methods including the gap effects has been proposed. See for example, Y. Jeong, et al., "Hybrid analytical modeling method for split power bus in multilayered package," *IEEE Trans. Electromagn. Compat.*, vol. 48, no. 1, pp. 82-94, February 2006. For realistic structures composed of a large number of layers with many holes and a complicated boundary, a unit-cell-based approach that can be obtained using a finite-difference approximation is more appropriate.

Finite-difference frequency-domain (FDFD) solution of the Helmholtz equation has been recently proposed as a simple and efficient method for modeling of single plane pairs. See for example, O. Ramahi, et al., "A simple finite-difference frequency-domain (FDFD) algorithm for analysis of switching noise in printed circuit boards and packages," *IEEE Trans. Adv. Packag.*, vol. 26, no. 2, pp. 191-198, May 2003.

Based on the finite-difference method (FDM), two equivalent circuit models for power/ground planes have been developed: T- and X-models. See A. E. Engin, et al., "Finite difference modeling of multiple planes in packages," presented at the Int. Zurich Symp. Electromagn. Compat., Zurich, Switzerland, February 2006. Also, Engin et al. show a general methodology to combine the frequency response of single plane pairs to obtain a model for multilayered planes taking into account the vertical coupling through the apertures. The multilayered FDM (MFDM) provides a simpler approach without any limit on the number of layers. It provides an accurate representation of wrap-around currents in complicated geometries, which have not been modeled before.

It would be desirable to have methods and software that may be used to model multilayer planes and provide equivalent circuit models for such structures based on multilayer difference methods.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 2b is an equivalent network model that illustrates the wrap-around currents shown in FIG. 2a;

FIG. 5b shows a combined T-unit cell model for the three plane unit cell shown in FIG. 5a;

FIG. 6 illustrates an exemplary equivalent circuit model for the one-dimensional case shown in FIGS. 2a and 2b, based on the multilayer finite difference method;

FIG. 7 illustrates segmentation of a transmission line with respect to unit cells of the plane model;

FIG. 8 illustrates integration of a stripline segment with an exemplary plane model;

FIG. 13 illustrates test vehicle 1 (TV1), showing cross section, location of ports, and top view of each layer;

FIG. 16 is a flow diagram that illustrates an exemplary multilayer finite difference method and software for electromagnetically simulating planar multilayer structures.

DETAILED DESCRIPTION

Figure 1:
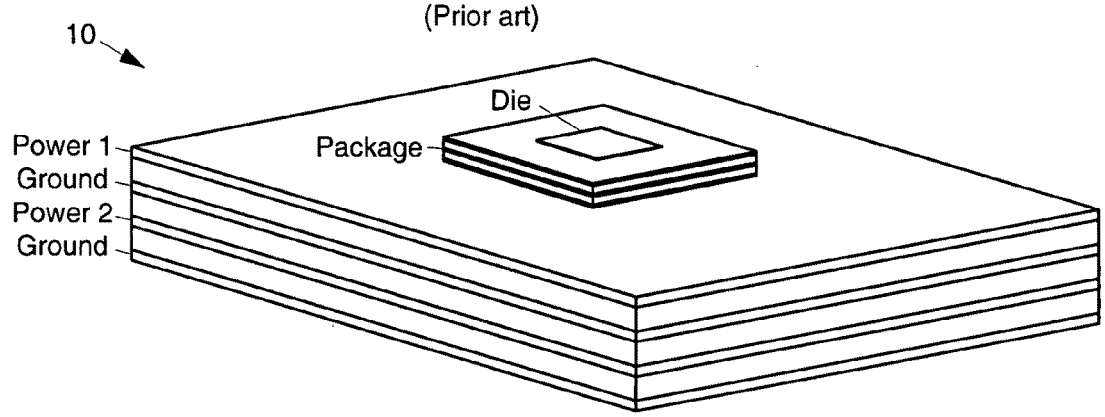
FIG. 1 illustrates an exemplary multilayer planar structure that may be modeled using exemplary multilayer finite difference methods.

Disclosed herein are multilayer finite difference methods (MFDM) and software for modeling multilayered structures comprising multiple power/ground planes with arbitrary power/ground assignments in the layer stack-up and arbitrary shapes. The multilayer finite difference methods and software may be used to simulate multilayered power/ground planes with vertical coupling between the planes caused by wrap-around currents. The multilayer finite difference methods and software may also be used for model-to-hardware correlation of multilayer structures with vertical field coupling between the plane pairs through apertures in selected planes.

The multilayer finite difference methods, and software may be used to electromagnetically simulate planar multilayer structures. The multilayer finite difference methods and software simulate multilayer planes by combining admittance matrices of single plane pairs and equivalent circuit models for the single plane pairs based on a multilayer finite difference approximation. The resulting model reduces to the well-known bed-spring model for a single plane pair. For time domain analysis, a circuit model is presented that may be included in a generic circuit solver such as the well-known Spice tool. A banded sparse matrix solver may be used for solving the network in the frequency domain. Using the multilayer finite difference methods and software, coupling between different layers through electrically large apertures can be modeled very accurately and efficiently.

For realistic structures having a large number of layers with many holes and a complicated boundary, a unit-cell based approach is employed that uses a finite difference approximation. In particular, two exemplary types of unit cells may be employed. These are T-unit cells (M-FDM-T) using a 5-point approximation of the Helmholtz equation, and X-unit cells (M-FDM-X) using a 9-point approximation of the Helmholtz equation.

A multilayered finite-difference method or software using T-unit cells (M-FDM-T) provides a simple and efficient method for modeling of multilayer structures without any limit on the number of layers. It provides an accurate representation of wrap-around currents in complicated geometries, which has not been modeled before. In the M-FDM-T approach, a multilayer unit-cell model is constructed by combining unit-cell models of single plane pairs. This is based on a unit cell model, which is an extension of the T-model for multilayered structures and based on the 5-point approximation of the Helmholtz equation. Via models may be included by connecting it to an M-FDM-T mesh at common nodes. The M-FDM-T approach may also be made more accurate by supplementing it with fringe and gap models to take into account second-order effects. Signal interconnects may be included in the M-FDM-T by connecting the reference nodes to the appropriate reference planes. The M-FDM-T electromagnetic solver considerably improves the simulation time of multilayer structures found in integrated circuit packages and printed circuit boards compared to full-wave electromagnetic solvers.

Another basic unit cell referred to as the X-model, can be obtained based on a 9-point approximation of the Helmholtz equation. The interconnection of the unit cells and the addition of transmission line, via, fringe, and gap models are same as in the M-FDM-T approach.]

Vertical Coupling Through Multilayer Planes

In a single plane pair, fundamental noise coupling occurs in a horizontal direction between the two planes that constitute the plane pair. The plane pair essentially acts as a resonator cavity. In a multilayer structure, there can be noise coupling in both horizontal and vertical directions through the power/ground planes. Such a structure includes multiple plane pairs. Vertical coupling may be considered as a coupling between these plane pairs. Assuming that the thickness of the metal is much larger than its skin depth, the vertical coupling through the conductors can be neglected. The major vertical coupling occurs through the interactions between these plane pairs at their boundaries. This coupling mechanism may be described as aperture coupling or coupling due to wrap-around currents as described in the following example.

Figure 2A:
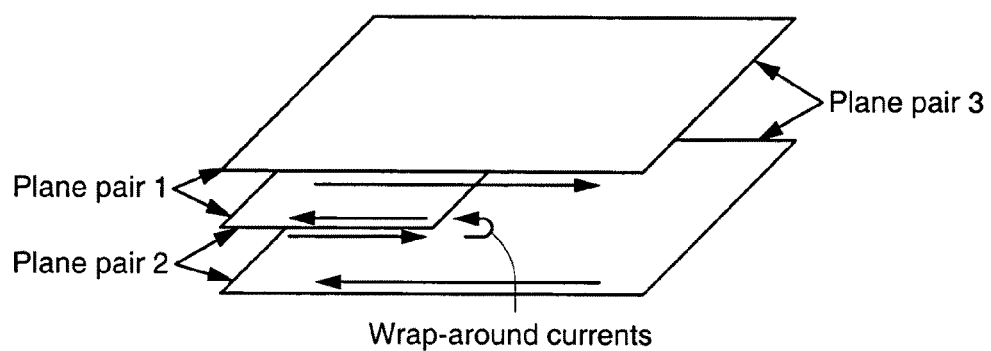
FIG. 2a illustrates wrap-around currents due to coupling through a gap in the middle plane for a simple one-dimensional case.

FIG. 2a shows a simple one-dimensional case, where the right-half of the middle plane is missing. For this example, there are three plane pairs based on different combinations of the planes. Assume that there is a current on the middle plane with its return current on the bottom plane. These currents are confined inside plane pair 2. When this current arrives at the right boundary of this plane pair, it can wrap-around the aperture. Hence, the so-called wrap-around current can excite currents in plane pair 1 and plane pair 3. This is a direct current coupling path between the plane pairs and is critical for an accurate estimation of coupling in multilayer planes.

Figure 2B:
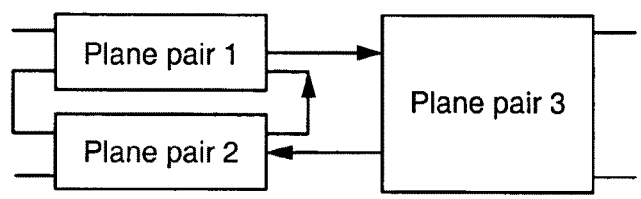

In order to model the wrap-around currents, the three plane pairs can be modeled separately and interconnected with each other, as shown in FIG. 2b. Such an interconnection enforces correct boundary conditions such that the wrap-around currents are taken into account. The electric field is assumed to have no horizontal components. Consequently, the fringe and gap fields are neglected. Such an assumption is accurate for large structures separated with a dielectric that has a small thickness. Hence, it is quite suitable for multilayer power/ground planes. If necessary, such second-order effects can be taken into account using additional circuit elements.

Regarding a practical implementation of the modeling approach shown in FIG. 2b, several points need consideration. First of all, there should be no conflict between the models regarding a common reference terminal for the definition, of voltages at the interconnection. This becomes important if circuit models with different ground references are used to model the plane pairs. Another problem is locating the boundaries between the plane pairs and realizing interconnections. This can be very difficult for a structure having many layers that have complicated boundaries.

The multilayer finite difference method and software disclosed herein overcomes these practical problems by defining multilayer unit-cell models that have the same ground reference, so that interconnection of the unit cells becomes straightforward. Details of the multilayer finite difference method and software are presented below.

Multilayer Finite Difference Method and Software

The underlying elliptic partial differential equation for modeling of planes is a Helmholtz equation:

$$(\nabla_T^2 + k^2)u = -j\omega\mu dJ_z \qquad (1)$$

where $\nabla_T^2$ is the transverse Laplace operator parallel to the planar structures, u is the voltage, d is the distance between the planes, k is the wave number, and $J_z$ is the current density injected normally to the planes. The problem definition is completed by assigning homogenous Neumann boundary conditions, which correspond to assuming a magnetic wall, or an open circuit, on the periphery of the planes.

Unit-Cell Models for a Single Plane Pair

Figure 3A:
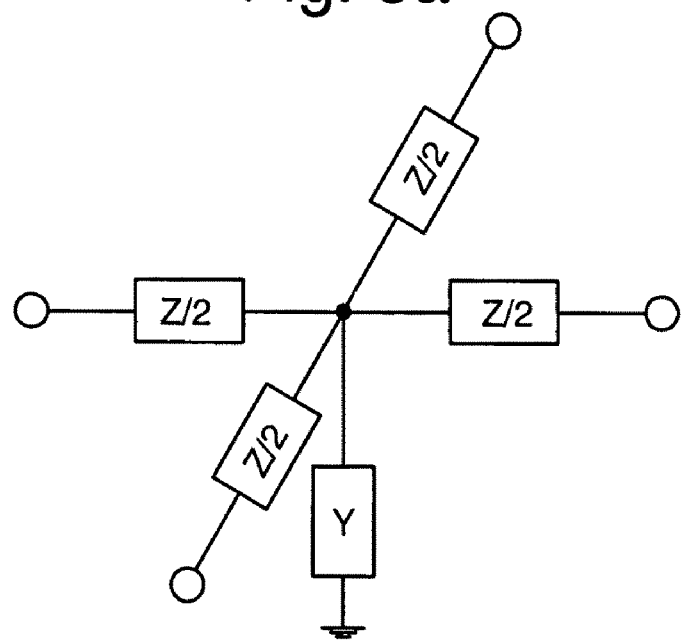
FIG. 3a illustrates an exemplary T unit cell model for a single plane pair.
Figure 3B:
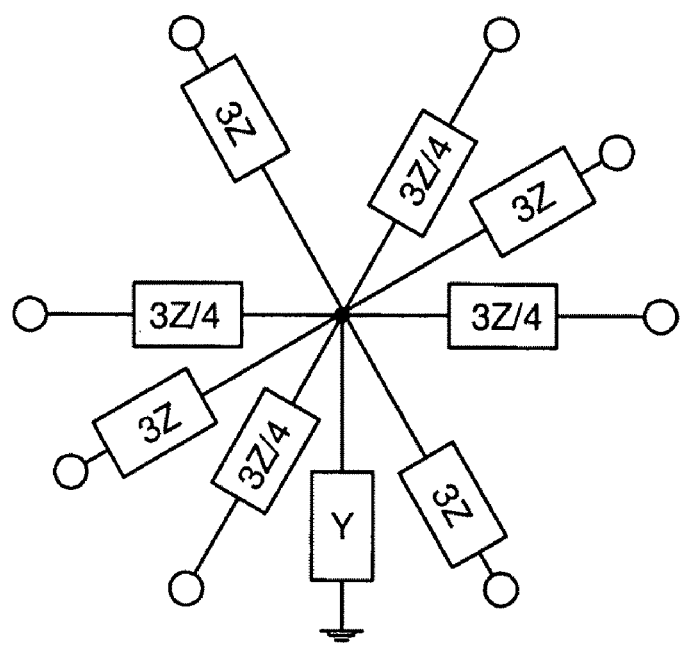
FIG. 3b illustrates an exemplary X unit cell model for a single plane pair.

One method to solve the Helmholtz equation is to apply a finite-difference scheme, which can be represented using different unit cells, as shown in FIGS. 3a and 3b. The impedances shown in the unit cells are half of the total impedances, between two neighboring nodes. When unit cells are connected with each other, two half impedances from neighboring unit cells establish the correct impedance value. The T unit-cell model is based on a five-point approximation of equation (1), whereas the X unit-cell model can be obtained from the nine-point finite-difference formula. The T unit cell results in the well-known bedspring model for a plane having inductors (L) between neighboring nodes and capacitors (C) from each node to ground. In FIGS. 3a and 3b, the per unit cell (p.u.c.) impedance and admittance are represented as $$Z = R + j\omega L \qquad (2)$$

$$Y = G + j\omega C \qquad (3)$$

$$C = \frac{\varepsilon h^2}{d} \qquad (4)$$

$$L = \mu d \qquad (5)$$

$$R = \frac{2}{\sigma t} + 2\sqrt{\frac{j\omega\mu}{\sigma}} \qquad (6)$$

$$G = \omega C \tan\delta \qquad (7)$$

for a given permittivity $\varepsilon$, permeability $\mu$, conductivity $\varepsilon$, conductor thickness t, loss tangent tan $\delta$, and cell size h. R in equation (6) represents the internal impedance, including both the dc and the skin effect resistance as well as the contribution of the internal inductance. The accuracy of the given equation for the conductance G in equation (7) has been sufficient in our experience. It can be used only for relatively lossless substrates and should be replaced with a more accurate equation that provides a causal response for very lossy substrates. The losses in the model basically influence the amplitudes of the frequency response.

A primary aspect of the X unit cell is that it includes a direct inductive path to diagonally neighboring cells in addition to the neighboring cells sharing a side. However, both T- and X-models are second order approximations to the Helmholtz equation. Consequently, the improvement in accuracy using the new X unit cell is not significant. Since the T unit cell based on the five-point discretization results in a simpler model, it is discussed below.

Multilayer Unit-Cell Model

The unit-cell models shown in FIGS. 3a and 3b use a common ground node. In a multilayer structure having more than two planes, unit cells of different plane pairs can assign this ground potential to different planes. Therefore, such unit cells cannot be stacked on top of each other without any modification of the multilayer plane model. A straightforward stacking would short-circuit the elements between two ground connections, resulting in a completely wrong model. As a result, a multilayer unit-cell model becomes necessary.

Figure 4A:
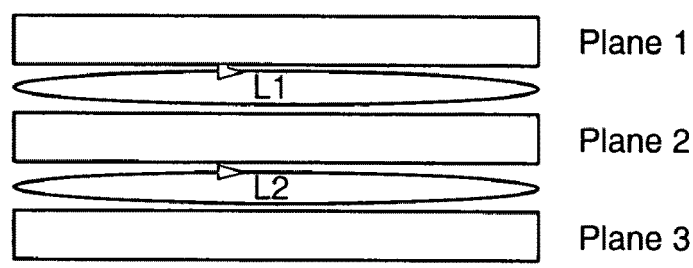
FIG. 4a illustrates a side view of a unit cell for a three-plane multilayer structure showing current loops associated with per unit cell inductances.

In order to obtain a model for the combined unit cell representing all the planes in the structure, consider the inductor elements in a unit cell, as shown in FIG. 4a. $L_1$ is the per unit cell inductance between plane 1 and plane 2, and $L_2$ is the inductance between planes 2 and 3. Hence, the reference planes are different in both models in FIG. 4b and $L_2$ would be short-circuited if the same nodes on plane 2 were connected to each other. In order to avoid this, the per unit cell inductances are combined, as shown in FIG. 4c, using a mutual inductance and assigning plane 3 as the reference plane. This model can be extended in a similar way to any number of planes. Physically, this model is based on the fact that there is a complete coupling of the magnetic flux when the return current is on plane 3, as represented by the mutual inductance that is equal to $L_2$.

One way of solving the equations obtained by the finite difference method (or software) is by using a nodal admittance matrix, which provides a method for interconnecting multiport networks with each other. It also allows interconnected grounded n-ports, as in the case of a multilayer structure, by using an indefinite admittance matrix as discussed by J. A. Dobrowolski, *Introduction to Computer Methods for*

*Microwave Circuit Analysis and Design*. Norwood, Mass.: Artech House, 1991. As an example, consider the inductance L1 between plane 1 and plane 2, as shown in the model at the top of FIG. 4b. The indefinite admittance matrix for this inductance is a four-port, which can be expressed as $$\begin{bmatrix} I_1 \\ I_2 \\ I_3 \\ I_4 \end{bmatrix} = \begin{bmatrix} Y_1 & -Y_1 & -Y_1 & Y_1 \\ -Y_1 & Y_1 & Y_1 & -Y_1 \\ -Y_1 & Y_1 & Y_1 & -Y_1 \\ Y_1 & -Y_1 & -Y_1 & Y_1 \end{bmatrix} \begin{bmatrix} V_1 \\ V_2 \\ V_3 \\ V_4 \end{bmatrix} \quad (8)$$

where $$Y_1 = 1/j\omega L1 \quad (9)$$

Figure 4B:
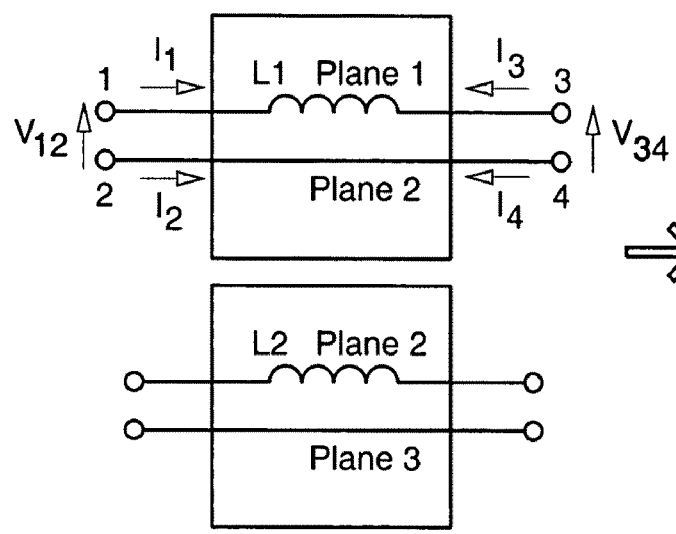
FIG. 4b shows the per unit cell inductance of each plane pair.
Figure 4C:
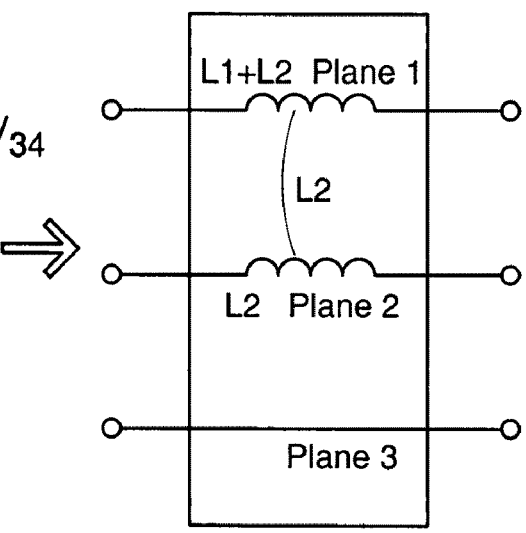
FIG. 4c illustrates the per unit cell inductances are combined by changing the reference planes.

This matrix can now be combined with the admittance matrix represent $L_2$ shown at the bottom of FIG. 4b as $$\begin{bmatrix} I_1 \\ I_2 \\ I_3 \\ I_4 \end{bmatrix} = \begin{bmatrix} Y_1 & -Y_1 & -Y_1 & Y_1 \\ -Y_1 & Y_1+Y_2 & Y_1 & -Y_1-Y_2 \\ -Y_1 & Y_1 & Y_1 & -Y_1 \\ Y_1 & -Y_1-Y_2 & -Y_1 & Y_1+Y_2 \end{bmatrix} \begin{bmatrix} V_1 \\ V_2 \\ V_3 \\ V_4 \end{bmatrix} \quad (10)$$

where $$Y_2 = 1/j\omega L2$$

It is assumed that plane 3 is chosen as the common reference terminal for the ports. It can be verified that this matrix represents the admittance matrix of the network in FIG. 4c, validating the previous derivation based on the physical considerations of magnetic flux coupling.

Similarly, a per unit cell capacitance C between nodes i and j can be added to the nodal admittance matrix as $$\begin{bmatrix} \vdots \\ I_i \\ \vdots \\ I_j \\ \vdots \end{bmatrix} = \begin{bmatrix} \ddots & & & & \\ & Y_c & \cdots & -Y_c & \\ & \vdots & \ddots & \vdots & \\ & -Y_c & \cdots & Y_c & \\ & & & & \ddots \end{bmatrix} \begin{bmatrix} \vdots \\ V_i \\ \vdots \\ V_j \\ \vdots \end{bmatrix} \quad (11)$$

where $$Y_c = j\omega C. \quad (12)$$

Using these rules to include the per unit cell parameters, the total nodal admittance matrix can be constructed. These parameters do not have to be defined always between two adjacent planes. For example, a unit cell can include inductances and capacitance between distant planes, if there are slots on the planes between them.

Figure 5A:
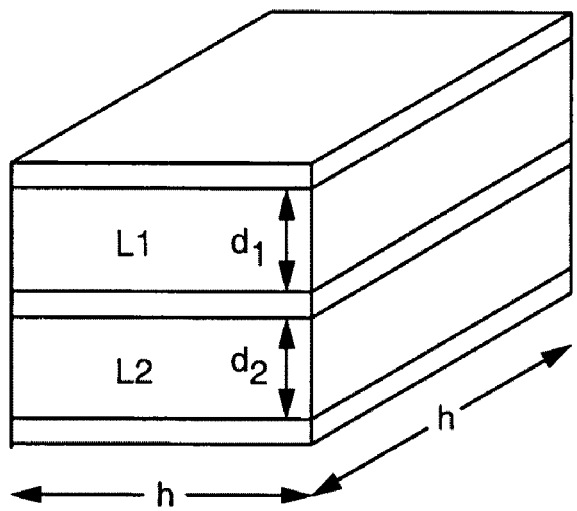
FIG. 5a illustrates the geometry of an exemplary three plane multilayer unit cell.
Figure 5B:
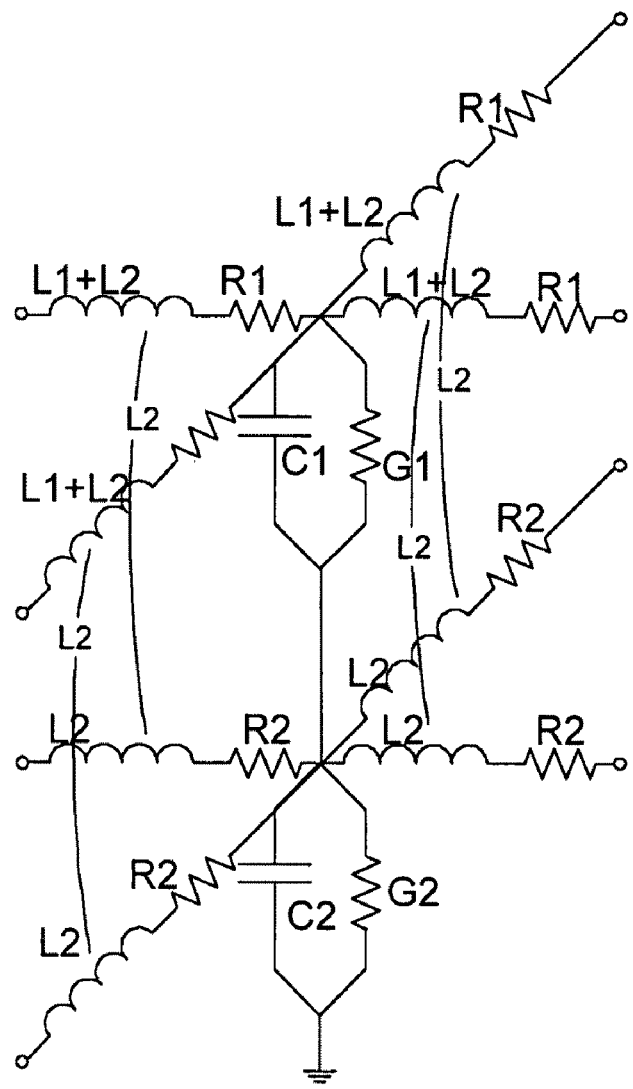
Figure 5C:
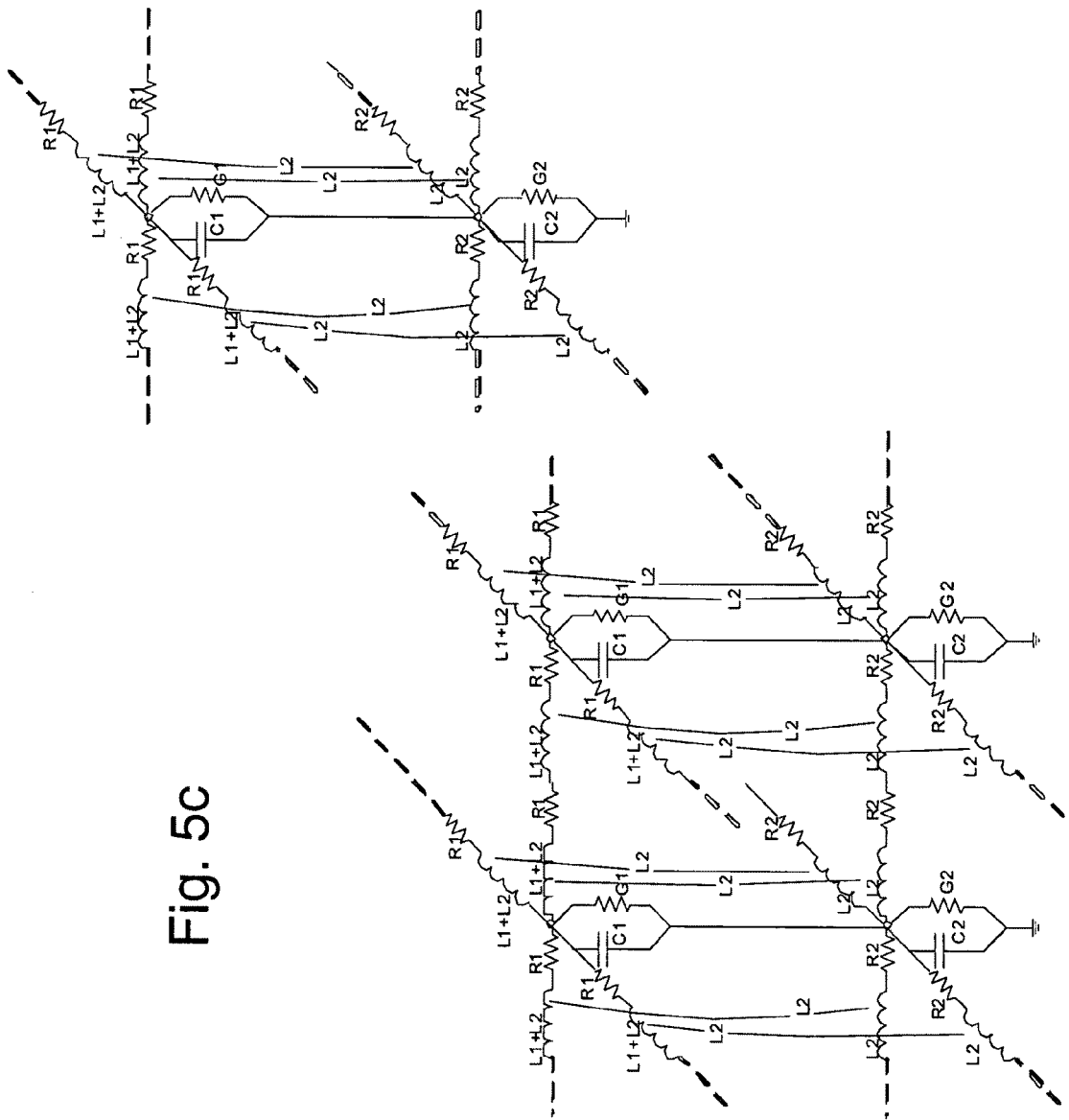
FIG. 5c illustrates a plane model comprising multilayer unit cells.

Equivalent circuit models are immediately available based on the multilayer finite difference methods. For example, FIG. 5b shows an equivalent circuit model for a sample unit cell including three planes as shown in FIG. 5a, where the bottom plane is chosen as the common reference terminal. Frequency-dependent loss terms can also be included using equations (6) and (7) for a frequency-domain simulation. For a time-domain analysis, they can be approximated using standard circuit elements such as are disclosed by A. E. Engin, et al., in "Closed-form network representations of frequency-dependent RLGC parameters," *Int. J. Circuit Theory Appl.*, vol. 33, pp. 463-485, November 2005. A simple frequency-independent model can also be used if the signals do not have a large bandwidth. In this case, the per unit cell resistance (R) and conductance (G) can be obtained at a given angular frequency, where a significant portion of the considered signals are concentrated in the spectrum. The per unit cell resistances in the model represent the resistance of single planes, where the bottom layer is assumed to be an ideal lossless ground plane.

As an example of the interconnection of the unit cells with each other, consider the one-dimensional case shown in FIGS. 2a and 2b. In such a structure, there are two different kinds of unit cells that can be interconnected, as shown in FIG. 6. The interconnection of different unit cell types with each other does not require any special consideration and can be done in a straightforward manner. The loss terms are not shown in FIG. 6 for clarity.

FIG. 7 shows the discretization of a transmission line with respect to the unit cell discretization of the planes. Each transmission line segment whose projection lies within a separate unit cell is added to the plane model as shown in FIG. 8. FIG. 8 shows an example for a stripline segment that is routed between a power plane and a ground plane. The stripline is assumed to have a characteristic impedance of $Z_{str}^c$, and separated with a distance of h1 from the ground plane and a distance of h2 from the power plane. Two parallel connected transmission line segments with characteristic impedances that are functions of $Z_{str}^c$, h1 and h2 are added to the plane model as shown in FIG. 8. Integration of a microstrip line is very similar to a stripline, where only one transmission line segment is added to the plane model. The reference nodes of the microstrip line are simply connected to the corresponding nodes on its reference plane.

Figure 9:
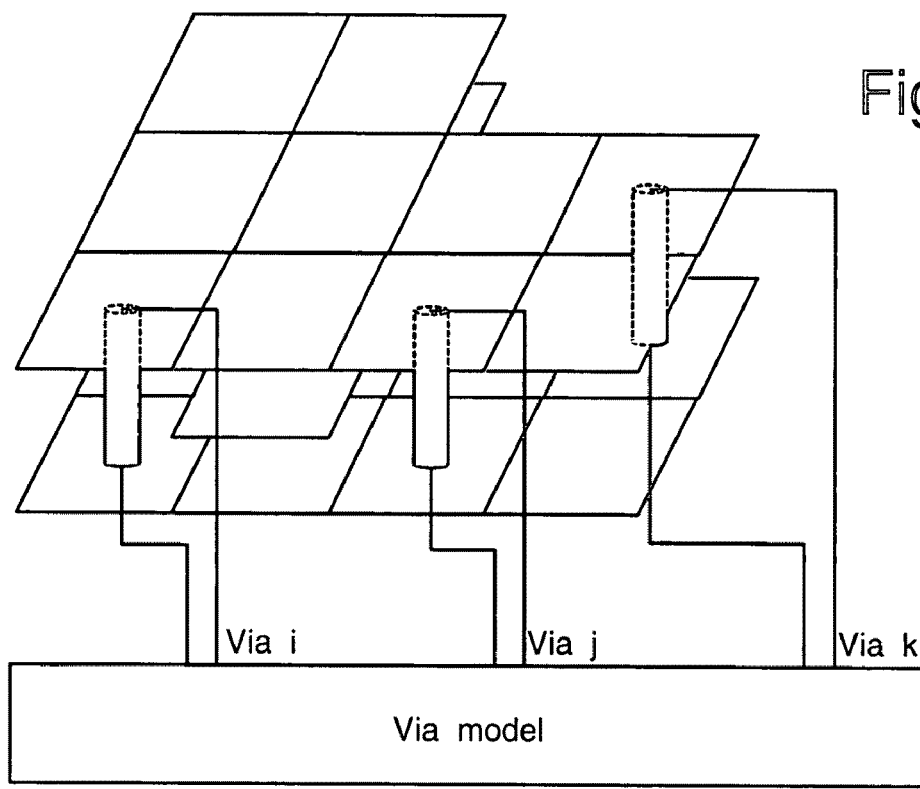
FIG. 9 illustrates connection of a via model to the appropriate unit cells of multilayer finite difference model of the planes.

FIG. 9 shows the discretization of a multilayered structure having multiple planes and a multitude of vias. In FIG. 9, it is assumed that there are 3 vias, and an arbitrary model is assumed to be available for the vias. The multitude of, via models are connected to the appropriate unit cells of the multilayer finite difference model of the planes as shown in FIG. 1. In this example, a 3-port model is assumed for 3 vias. However, vias can be discretized into segments in the vertical direction as well. In that case, the via models include additional ports such that the total number of ports in the via model is equivalent to the total number of via segments.

Figure 10:
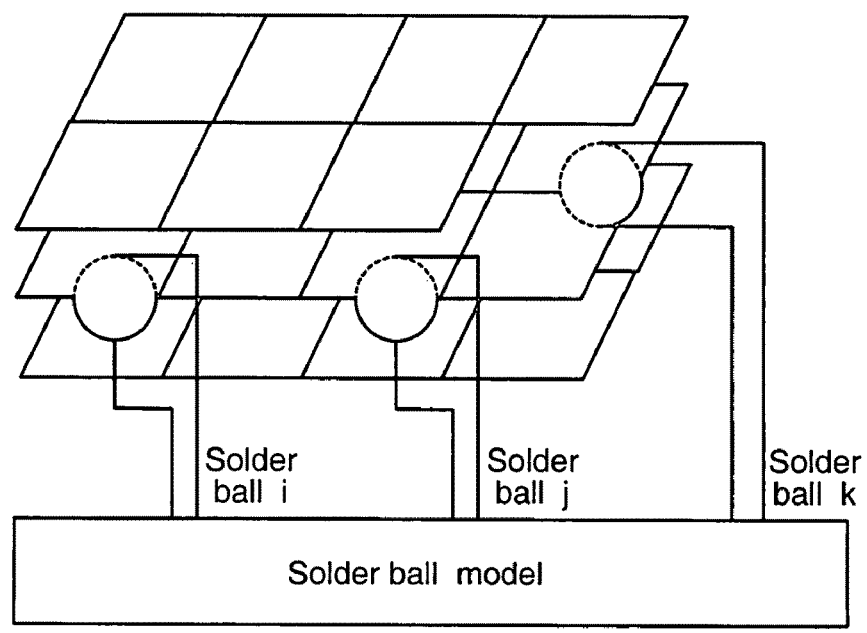
FIG. 10 illustrates connection of a solder ball model to an appropriate unit cells of the multilayer finite difference model of the planes.

Integration of solder balls in the multilayer finite difference method is similar to the integration of vias. FIG. 10 shows the discretization of a multilayered structure having multiple planes and a multitude of solder balls. In FIG. 10, it is assumed that there are 3 solder balls, and an arbitrary model is assumed to be available for the solder balls. The multitude of solder ball models are connected to the appropriate unit cells of the multilayer finite difference model of the planes as shown in the figure.

Figure 11:
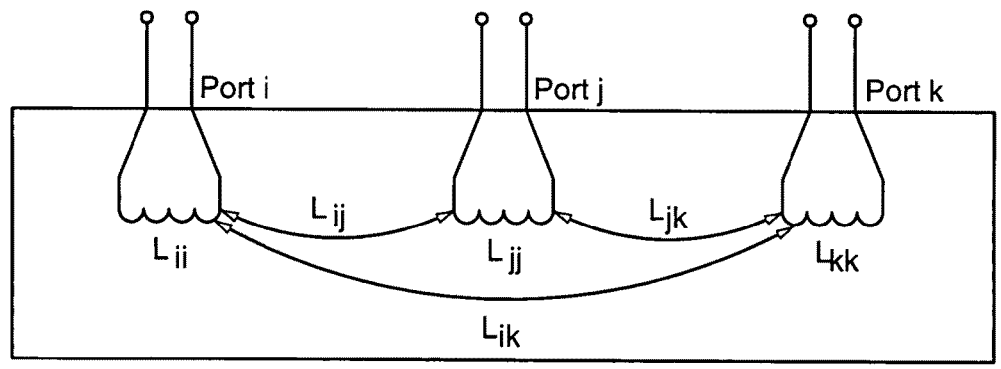
FIG. 11 illustrates one possible model for the vias or solder balls.

The main parasitic effect of vias and solder balls are their inductance. Hence, to a first order, a coupled inductance model can be used as shown in FIG. 11. In FIG. 11, $L_{ii}, L_{jj}, L_{kk}$ are self inductances, and $L_{ij}, L_{ik}, L_{jk}$ are mutual inductances. The values of these inductances can be obtained using simple analytic equations or through additional electromagnetic simulations. The resistance and parasitic capacitance can be included as well to increase the accuracy of this model.

Figure 12:
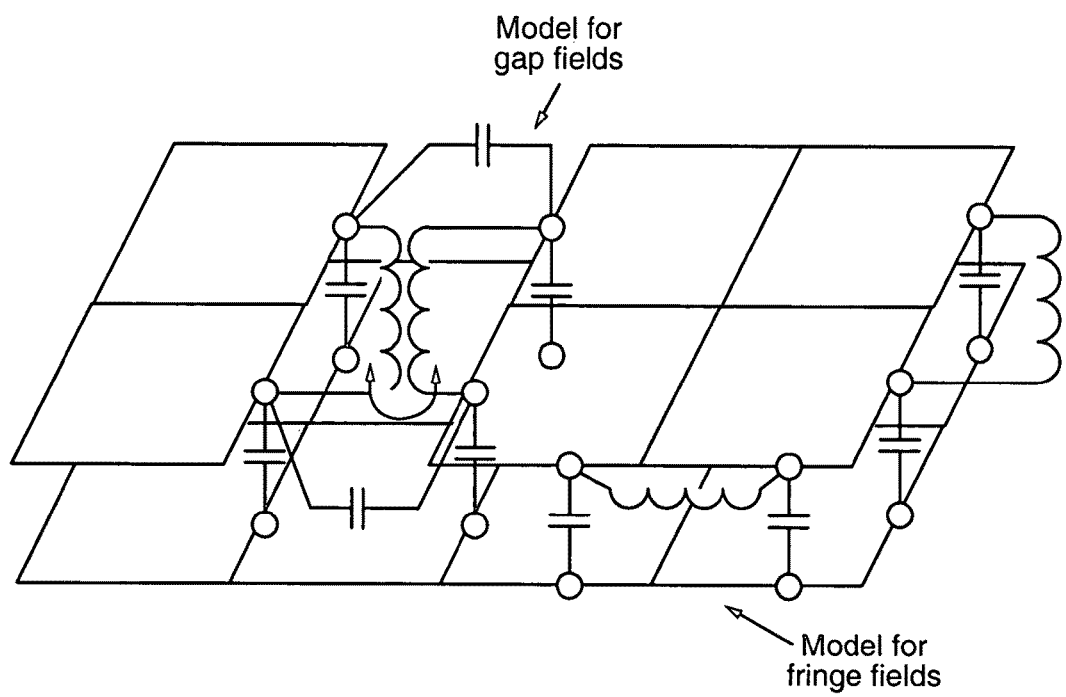
FIG. 12 illustrates connection of the fringe and gap models to the appropriate unit cells of the multilayer finite difference model of the planes.

FIG. 12 shows the integration of models for fringe and gap fields. The fringe fields are represented using fringe capacitances and inductances along the unit cells on the boundaries of the planes. The gap fields are represented as coupling capacitances and mutual inductances between planes. The values of these circuit elements can be obtained using simple analytic equations or additional electromagnetic simulations.

In addition to these parasitic elements, any other circuit element can be simply added to the multilayer unit cell model. One example is the addition of decoupling capacitors. A model for a decoupling capacitor can be added between the two unit cells that correspond to pads of the decoupling capacitor.

Once the models for planes, vias, solder balls, fringe fields, gap fields, and any additional circuit elements, such as decoupling capacitors, are combined, the overall matrix equation or circuit model can be solved to obtain the time domain or frequency domain response at the pre-defined ports of the model. In addition, the noise voltage distribution on the surface of the planes can be calculated at a give frequency. For a multilayer structure, the noise voltage at each plane is calculated with respect to the next plane below it.

Measurement Comparison

For verification of the MFDM, a test case was considered. The test vehicle (TV1) is a three-layered structure, as shown in FIG. 13., In TV1, there is a hole in the middle plane (plane 2). Port 1 is between plane 1 and 2; and port 2 is between plane 2 and plane 3. In such a three-plane structure, there are three plane pairs. These plane pairs are coupled at their boundaries. The general shapes of the planes are similar to a test structure discussed by J.-H. Kim et al., in "Modeling of multilayered power distribution planes using transmission matrix method," *IEEE Trans. Adv. Packag.*, vol. 25, no. 2, pp. 189-199, May 2002, although different geometrical sizes are used in this example. The layers are not isolated from each other with solid ground planes, so that wrap-around currents can occur. Current flowing into the boundary of a plane pair will spread into other plane pairs, which results in wrap-around currents.

Figure 14A:
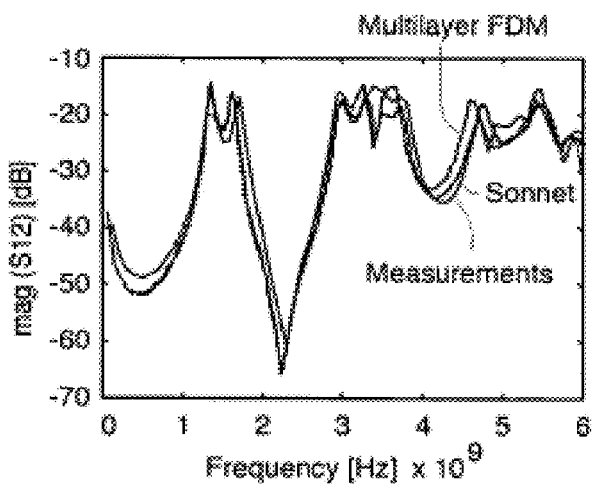
FIG. 14a is a graph that illustrates the magnitude of the transmission coefficient S12 for test vehicle 1.
Figure 14B:
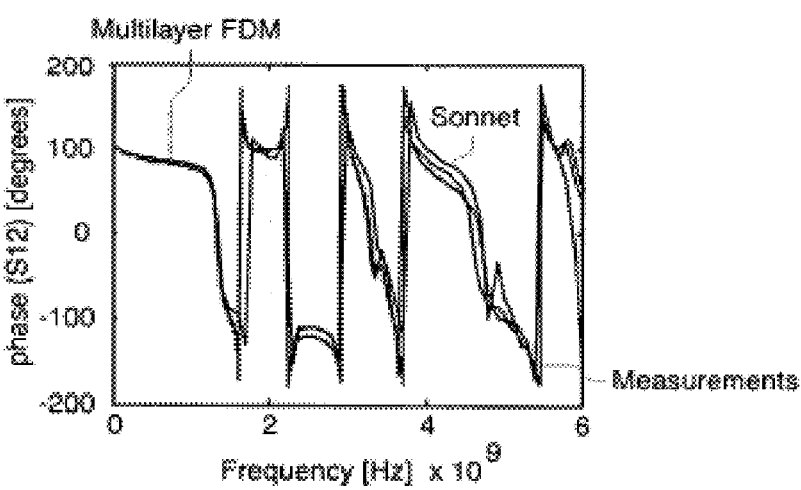
FIG. 14b is a graph that illustrates the phase of the transmission coefficient S12 for test vehicle 1.

The multiple plane structure TV1 was fabricated using FR4 dielectric layers with $\epsilon_r=4$, tan $\delta=0.02$. FIGS. 14a and 14b show that there is an excellent agreement regarding the transmission coefficient S12 obtained from measurements of TV1. S12 is solely due to the coupling through the aperture and could be very accurately captured. This is a large amount of coupling, which could cause a signal integrity problem if, for example, top and bottom planes were assigned different voltage levels.

The same structure was also simulated using Sonnet, giving similar results. All simulations were done on an Intel Xeon workstation with a 3-GHz CPU and 3.25-GB RAM. Calculation of each frequency point required 1.35 s using MFDM implemented in Matlab, and 94 s using Sonnet, resulting in simulation speedup by a factor of about 70.

Figure 15:
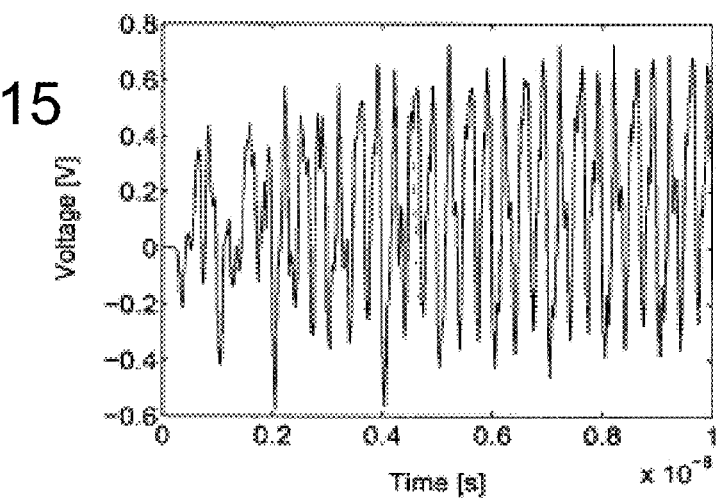
FIG. 15 illustrates simulated switching noise voltage at port 2 for a noise current source at port 1 for test vehicle 1.
Figure 15A:
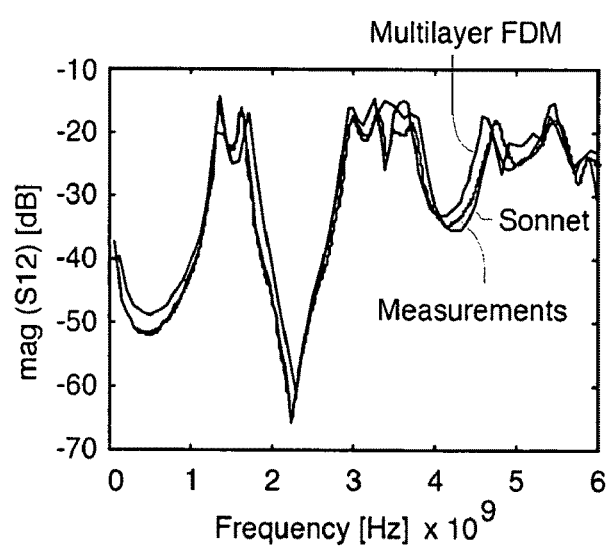
Figure 15B:
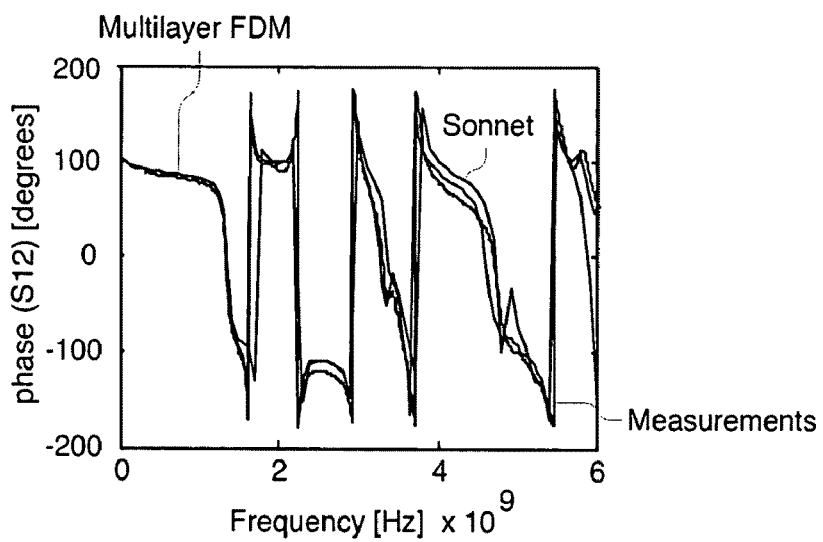

TV1 was also simulated in the time domain using an equivalent circuit model based on the unit-cell model shown in FIGS. 5a and 5b. The conductor and substrate losses were taken into account using resistors R1, R2, G1, and G2, whose values were calculated at 3 GHz. A more accurate representation of the frequency-dependent behavior due to losses can be included using skin-effect and Debye models. Port 1 was stimulated with a trapezoidal current waveform with rise/fall times of 100 ps, period of 1 ns, and magnitude of 1 A. FIG. 15 shows the noise voltage waveform at port 2. The noise voltage can be higher than 1 V peak-to-peak, which can cause a signal integrity or EMI problem especially if there are simultaneously switching drivers.

For the purposes of completeness, FIG. 16 is a flow diagram illustrating an exemplary multilayer finite difference method 10 and software 10 for electromagnetically simulating planar multilayer structures. The exemplary multilayer finite difference method 10 and software 10 is implemented as follows.

With regard to the method 10, data file is provided 11 that defines the material properties and layout of each plane, transmission line and via of the planar multilayer structure. A plurality of unit cells are defined 12 that each represent a portion of the planar multilayer structure and that includes all planes of the planar multilayer structure. For each unit cell, the data associated with the cell are processed 13 to generate an individual equivalent circuit model for that cell using a multilayer finite difference method. The unit cells are interconnected 14 to create an overall circuit model for the planar multilayer structure. The overall circuit model is processed 15 to obtain frequency or time domain responses for the planar multilayer structure.

Processing 13 the data to generate an individual equivalent circuit model may be achieved by generating admittance matrices of single plane pairs of a planar multilayer structure, generating equivalent circuit models for the single plane pairs to generate equivalent unit-cell models, and generating a multilayered unit-cell model using a finite difference approximation that combines the unit-cell models and the admittance matrices of the single plane pairs. Interconnection 14 of the unit cells may be achieved by short circuiting adjacent unit cells of the overall circuit model to produce the overall circuit model.

Processing 15 the overall circuit model may be achieved by defining a matrix equation based upon the overall circuit model and simulation parameters for a desired simulation setup, and solving the matrix equation to generate frequency or time domain responses for the planar multilayer structure. Processing 15 the overall circuit model may also be achieved by defining simulation parameters for a desired simulation, setup, and processing the overall circuit model and the simulation parameters using a circuit solver to obtain frequency and time domain responses for the planar multilayer structure.

Furthermore, transmission line models, via models, and fringe and gap models may be processed and interconnected to the overall circuit model. Transmission line models are included by processing data defining transmission line segments associated with each of the unit cells to generate transmission line models for each segment of the transmission line, and connecting the transmission line models at common nodes of the overall multilayer circuit model. Via models are included by generating via models for the single plane pairs, and connecting the via models to common nodes to construct the multilayered unit-cell model. Fringe and gap models may be taken into account by generating fringe and gap models for the single plane pairs to take into account second-order effects, and constructing the multilayered unit-cell model by combining unit-cell models of the single plane pairs along with the fringe and gap models.

With regard to the software 10, it is configured to process a data file 11 that defines the material properties and layout of each plane, transmission line and via of a planar multilayer structure to electromagnetically simulate the planar multilayer structure. A number of code segments of the software implement this.

In particular, the software comprises a code segment 12 that defines a plurality of unit cells that each represent a portion of the planar multilayer structure and that includes all planes of the planar multilayer structure. A code segment 13 is provided that, for each unit cell, processes the data associated with the cell to generate an individual equivalent circuit model for that cell using a multilayer finite difference method. A code segment 14 is provided that interconnects the unit cells to create an overall circuit model for the planar multilayer structure. A code segment 15 is provided is provided that processes the overall circuit model to obtain frequency or time domain responses for the planar multilayer structure.

In summary, a new method, referred to as a multilayer finite difference method (MFDM), and associated software, that models multiple plane pairs coupled through apertures has been disclosed. Two equivalent circuit models based on the finite difference method have been disclosed, which are T- and X-models. In general, both models are second-order approximations for the Helmholtz equation. Hence, the T-model is preferable due to its simplicity.

There is excellent agreement between the multilayer finite difference method and software and measurements of multi-layered structures with three and four planes. A speedup by a factor of about 70 was obtained compared to a run-time of a full-wave simulator. A high level of noise coupling was observed due to the wrap-around currents around the slots in the planes. The method and software accurately predicts noise coupling, which can cause signal integrity and EMI problems.

The multilayer finite difference method and software are based on unit cells and also provides an equivalent circuit model for multilayer planes in a simple way. It can be used to model power/ground planes with arbitrary power/ground assignments in the layer stack-up. The multilayer finite difference method and software are useful in modeling the signal integrity and EMI behavior of realistic structures with multi-layered planes having arbitrary shapes.

Thus, finite difference methods and software for electromagnetically simulating planar multilayer structures have been disclosed. It is to be understood that the above-described embodiments are merely illustrative of some of the many specific embodiments that represent applications of the principles discussed above. Clearly, numerous and other arrangements can be readily devised by those skilled in the art without departing from the scope of the invention.

What is claimed is:

1. A method, operable on a digital computer, for electromagnetically simulating a planar multilayer structure, comprising: providing a data file to the digital computer that defines the material properties and layout of each plane, transmission line and via of the planar multilayer structure; defining, with the digital computer, a plurality of unit cells that each represent a portion of the planar multilayer structure and that includes all planes of the planar multilayer structure; for each unit cell; processing, using the digital computer, the data associated with the cell to generate an individual equivalent circuit model for that cell using a multilayer finite difference method; employing the digital computer to interconnect the unit cells to create an overall circuit model for the planar multilayer structure; processing, using the digital computer, the overall circuit model to obtain frequency or time domain responses for the planar multilayer structure; generating, with the digital computer, fringe and gap models for the single plane pairs to take into account second-order effects; and constructing, with the digital computer, a multilayered unit-cell model by combining unit-cell models of the single plane pairs along with the fringe and gap models.

2. The method recited in claim 1 wherein processing the overall circuit model comprises: defining a matrix equation based upon the overall circuit model and simulation parameters for a desired simulation setup; and solving the matrix equation to generate frequency or time domain responses for the planar multilayer structure.

3. The method recited in claim 1 processing the overall circuit model comprises: defining simulation parameters for a desired simulation setup; and processing the overall circuit model and the simulation parameters using a circuit solver to obtain frequency and time domain responses for the planar multilayer structure.

4. The method recited in claim 1 wherein interconnection of the unit cells is achieved by short circuiting adjacent unit cells of the overall circuit model to produce the overall circuit model.

5. The method recited in claim 1 wherein a multilayer finite difference approximation of the Helmholtz equation is used for each plane pair in the unit cell to obtain the parameters of the unit cell.

6. The method recited in claim 1 wherein processing the data to generate an individual equivalent circuit model comprises: generating admittance matrices of single plane pairs of a planar multilayer structure; generating equivalent circuit models for the single plane pairs to generate equivalent unit-cell models; and generating a multilayered unit-cell model using a finite difference approximation that combines the unit-cell models and the admittance matrices of the single plane pairs.

7. The method recited in claim 1 further comprising: processing data defining transmission line segments associated with each of the unit cells to generate transmission line models for each segment of the transmission line; and connecting the transmission line models at common nodes of the overall multilayer circuit model.

8. The method recited in claim 7 wherein if the transmission line is a stripline, splitting the stripline into parallel-connected striplines and connecting the parallel-connected striplines to the common nodes.

9. The method recited in claim 7 wherein if the transmission line is a micro-stripline, connecting it to the common nodes of the multilayer circuit model.

10. The method recited in claim 1 further comprising: generating via models for the single plane pairs; and connecting the via models to common nodes to construct the multi-layered unit-cell model.

11. A method, operable on a digital computer, for electromagnetically simulating a planar multilayer structure, comprising: providing a data file to the digital computer that defines the material properties and layout of each plane, transmission line and via of the planar multilayer structure; defining, with the digital computer, a plurality of unit cells that each represent a portion of the planar multilayer structure and that includes all planes of the planar multilayer structure; for each unit cell, processing, using the digital computer, the data associated with the cell to generate an individual equivalent circuit model for that cell using a multilayer finite difference method; employing the digital computer to interconnect the unit cells to create an overall circuit model for the planar multilayer structure; processing, using the digital computer, the overall circuit model to obtain frequency or time domain responses for the planar multilayer structure; wherein the approximation is either a 5-point approximation or a 9-point approximation.

12. Software stored on a non-transitory computer readable medium for processing a data file that defines the material properties and layout of each plane, transmission line and via of a planar multilayer structure to electromagnetically simulate the planar multilayer structure, comprising: a code segment that defines a plurality of unit cells that each represent a portion of the planar multilayer structure and that includes all planes of the planar multilayer structure; a code segment that, for each unit cell, processes the data associated with the cell to generate an individual equivalent circuit model for that cell using a multilayer finite difference method; a code segment that interconnects the unit cells to create an overall circuit model for the planar multilayer structure; a code segment that processes the overall circuit model to obtain frequency or time domain responses for the planar multilayer structure; a code segment that generates fringe and gap models for the single plane pairs to take into account second-order effects; and a code segment that constructs a multilayered unit-cell model by combining unit-cell models of the single plane pairs along with the fringe and gap models.

13. The software recited in claim 12 wherein the code segment that processes the overall circuit model to obtain frequency or time domain responses comprises: a code segment that defines a matrix equation based upon the overall circuit model and simulation parameters for a desired simulation setup; and a code segment that solves the matrix equation to generate frequency or time domain responses for the planar multilayer structure.

14. The software recited in claim 12 wherein the code segment that processes the overall circuit model to obtain frequency or time domain responses comprises: a code segment that defines simulation parameters for a desired simulation setup; and a code segment that processes the overall circuit model and the simulation parameters using a circuit solver to obtain frequency and time domain responses for the planar multilayer structure.

15. The software recited in claim 12 wherein the code segment that interconnects the unit cells comprises: a code segment that interconnects the unit cells by short circuiting adjacent unit cells of the overall circuit model to produce the overall circuit model.

16. The software recited in claim 12 further comprising: a code segment that generates admittance matrices of single plane pairs of a planar multilayer structure; a code segment that generates equivalent circuit models for the single plane pairs to generate equivalent unit-cell models; and a code segment that generates a multilayered unit-cell model using a finite difference approximation that combines the unit-cell models and the admittance matrices of the single plane pairs.

17. The software recited in claim 12 further comprising: a code segment that processes data defining transmission line segments associated with each of the unit cells to generate transmission line models for each segment of the transmission line; and a code segment that connects the transmission line models at common nodes of the overall multilayer circuit model.

18. The software recited in claim 12 further comprising: a code segment that generates via models for the single plane pairs; and a code segment that connects the via models to common nodes to construct the multilayered unit-cell model.

* * * * *